(12) United States Patent
Vimberg et al.

(10) Patent No.: US 10,326,646 B2
(45) Date of Patent: Jun. 18, 2019

(54) ARCHITECTURAL DESIGN TO ENABLE BIDIRECTIONAL SERVICE REGISTRATION AND INTERACTION AMONG CLUSTERS

(71) Applicant: Oracle International Corporation, Redwood Shores, CA (US)

(72) Inventors: Juan Ignacio Vimberg, Foster City, CA (US); Jonathan Lopez Lopez, San Mateo, CA (US); Rodolfo José Cruz, Foster City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 239 days.

(21) Appl. No.: 15/469,343

(22) Filed: Mar. 24, 2017

(65) Prior Publication Data
US 2018/0077010 A1 Mar. 15, 2018

Related U.S. Application Data

(60) Provisional application No. 62/395,235, filed on Sep. 15, 2016, provisional application No. 62/395,306, filed on Sep. 15, 2016.

(51) Int. Cl.
| | |
|---|---|
| G06F 8/60 | (2018.01) |
| G06F 9/50 | (2006.01) |
| G06F 9/445 | (2018.01) |
| H04L 12/24 | (2006.01) |
| H04L 29/08 | (2006.01) |

(52) U.S. Cl.
CPC ...... *H04L 41/0803* (2013.01); *G06F 9/44505* (2013.01); *G06F 9/5083* (2013.01); *H04L 41/0233* (2013.01); *H04L 67/34* (2013.01); *G06F 8/60* (2013.01); *H04L 41/20* (2013.01)

(58) Field of Classification Search
None
See application file for complete search history.

(56) References Cited

U.S. PATENT DOCUMENTS

| | | | |
|---|---|---|---|
| 9,692,707 B2 * | 6/2017 | Tang | G06F 9/45533 |
| 2014/0310235 A1 * | 10/2014 | Chan | G06F 17/30598 |
| | | | 707/603 |

* cited by examiner

*Primary Examiner* — Brian Whipple
(74) *Attorney, Agent, or Firm* — Trellis IP Law Group, PC

(57) ABSTRACT

Implementations described herein provide a bidirectional tool configured to employ application program interfaces (APIs), cross-cluster service handshakes, and design and implementation enabling two or more instances of an application registered to one cluster and other clusters to provide multi environment interaction. Using a common service registration, users can trigger actions on different instances of the application running in different environments such as a development environment, production environment, and the like. Using the common registration, applications can scale by having extra instances running while a centralized service works as central hub were each instance is registered. Moreover, implementations include utilizing a plurality of deployment asset management layers to establish a stateless API instantiated between point-of-delivery server arrays employed to house multiple customers separated by security partitions.

20 Claims, 10 Drawing Sheets

Deployment Asset Manager RESTful Services

DAM

| Resource URI | Operation | Description | Version | | Authorization Header Parameters | Query Parameters | | | | | | | Form Parameters | |
|---|---|---|---|---|---|---|---|---|---|---|---|---|---|---|
| | | | Cloud | On-prem | Encoded Credentials | Partition | SpaceId | Revision | Snapshot | Version | Composite | Flags | Project Zip | Project Configuration |
| bpm/management/1.0/rest/projects | GET | Gets a list of deployed projects | ⊘ | ⊘ | ⊘ | ⊘ | ⊠ | ⊠ | ⊠ | ⊠ | ⊠ | ⊠ | ⊠ | ⊠ |
| bpm/management/1.0/rest/projectid/{composite} | GET | Gets an specific deployed project by compositedn | ⊘ | ⊘ | ⊘ | ⊠ | ⊠ | ⊠ | ⊠ | ⊠ | ⊠ | ⊠ | ⊠ | ⊠ |
| bpm/management/1.0/rest/{projectid}/deploy | POST | Deploys a project passed by path param | ⊘ | ⊘ | ⊘ | ⊘ | ⊘ | ⊘ | ⊘ | ⊘ | ⊘ | ⊘ | ⊘ | ⊘ |
| bpm/management/1.0/rest/projects/{projectid} | DELETE | Undeploys a project from engine | ⊘ | ⊘ | ⊘ | ⊠ | ⊠ | ⊠ | ⊠ | ⊠ | ⊠ | ⊠ | ⊠ | ⊠ |
| bpm/management/1.0/rest/projects/{projectid}/activate | POST | Activates a project in runtime | ⊘ | ⊘ | ⊘ | ⊠ | ⊠ | ⊠ | ⊠ | ⊠ | ⊘ | ⊠ | ⊠ | ⊠ |
| bpm/management/1.0/rest/projects/{projectid}/retire | POST | Retires a project in runtime | ⊘ | ⊘ | ⊘ | ⊠ | ⊠ | ⊠ | ⊠ | ⊠ | ⊘ | ⊠ | ⊠ | ⊠ |
| bpm/management/1.0/rest/projects/{projectid}/start | POST | Starts a project in runtime | ⊠ | ⊘ | ⊘ | ⊠ | ⊠ | ⊠ | ⊠ | ⊠ | ⊘ | ⊠ | ⊠ | ⊠ |
| bpm/management/1.0/rest/projects/{projectid}/stop | POST | Stops a project in runtime | ⊠ | ⊘ | ⊘ | ⊠ | ⊠ | ⊠ | ⊠ | ⊠ | ⊠ | ⊠ | ⊠ | ⊠ |
| bpm/management/1.0/rest/projects/{projectid}/sar | POST | Creates a project sar file | ⊘ | ⊘ | ⊘ | ⊠ | ⊠ | ⊠ | ⊠ | ⊠ | ⊠ | ⊠ | ⊠ | ⊠ |
| bpm/management/1.0/rest/projects/{projectid}/plan | POST | Creates a project deployment plan | ⊘ | ⊘ | ⊘ | ⊠ | ⊠ | ⊠ | ⊠ | ⊠ | ⊠ | ⊠ | ⊠ | ⊠ |
| bpm/management/1.0/rest/pubKey | GET | Gets system publick key for password encryption | ⊘ | ⊘ | ⊠ | ⊠ | ⊠ | ⊠ | ⊠ | ⊠ | ⊠ | ⊠ | ⊠ | ⊠ |
| bpm/management/1.0/rest/register/dev/external | POST | Saves external pod url | ⊘ | ⊘ | ⊠ | ⊠ | ⊠ | ⊠ | ⊠ | ⊠ | ⊠ | ⊠ | ⊠ | ⊠ |

FIG. 6A

| URL | Method | Description | Encoded Credentials | Partition | Project |
|---|---|---|---|---|---|
| bpm/management/1.1/rest/paritions/{partition}/projects/ | GET | Gets a list of deployed projects | ⊘ | ⊘ | ✗ |
| bpm/management/1.1/rest/paritions/{partition}/projects/{project}/revisions/{revision} | GET | Gets an specific deployed project by compositedn | ⊘ | ⊘ | ⊘ |
| bpm/management/1.1/rest/paritions/{partition}/projects/{project}/revisions/{revision} | POST | Deploys a project passed by path param | ⊘ | ⊘ | ⊘ |
| bpm/management/1.1/rest/paritions/{partition}/projects/{project}/revisions/{revision} | DELETE | Undeploys a project from runtime | ⊘ | ⊘ | ⊘ |
| bpm/management/1.1/rest/paritions/{partition}/projects/{project}/revisions/{revision}/activate | PUT | Activates a project in runtime | ⊘ | ⊘ | ⊘ |
| bpm/management/1.1/rest/paritions/{partition}/projects/{project}/revisions/{revision}/retire | PUT | Retires a project in runtime | ⊘ | ⊘ | ⊘ |
| bpm/management/1.1/rest/paritions/{partition}/projects/{project}/revisions/{revision}/start | PUT | Starts a project in runtime | ⊘ | ⊘ | ⊘ |
| bpm/management/1.1/rest/paritions/{partition}/projects/{project}/revisions/{revision}/stop | PUT | Stops a project in runtime | ⊘ | ⊘ | ⊘ |
| bpm/management/1.1/rest/paritions/{partition}/projects/{project}/revisions/{revision}/services/{service} | PUT | Update service endpoint for deployed project in runtime | ⊘ | ⊘ | ⊘ |
| bpm/management/1.1/rest/projects/{projectid}/sar | POST | Creates a project sar file | ⊘ | ✗ | ✗ |
| bpm/management/1.1/rest/projects/{projectid}/plan | POST | Creates a project deployment plan | ✗ | ✗ | ✗ |
| bpm/management/1.1/rest/pubKey | GET | Gets system publick key for password encryption | ✗ | ✗ | ✗ |
| bpm/management/1.1/rest/register/dev/external | POST | Saves external pod url | ✗ | ✗ | ✗ |

FIG. 6B

ARCHITECTURAL DESIGN TO ENABLE BIDIRECTIONAL SERVICE REGISTRATION AND INTERACTION AMONG CLUSTERS

CROSS-REFERENCE TO RELATED APPLICATIONS

This application claims priority from U.S. Provisional Patent Application Ser. No. 62/395,235, entitled ARCHITECTURAL DESIGN TO ENABLE BI-DIRECTIONAL SERVICE REGISTRATION AND INTERACTION AMONG CLUSTERS, filed on Sep. 15, 2016 and U.S. Provisional Patent Application Ser. No. 62/395,306, entitled DEPLOYMENT ASSET MANAGEMENT, filed on Sep. 15, 2016, which are hereby incorporated by reference as if set forth in full in this application for all purposes.

BACKGROUND

The following relates to fully contained configurations associated with services and software programs instantiated on networked databases. More specifically, the following relates to deploying and managing software programs instantiated within the Cloud.

Cloud computing provides a model for enabling a ubiquitous on-demand access to a shared pool of configurable computing resources such as computer networks, servers, storage, applications and services. Cloud computing can be rapidly provisioned and released allowing users and enterprises with various capabilities to store and process their data using privately owned data centers or third-party data centers that may be located far from the user. To achieve coherence and economy of scale, Cloud computing relies on sharing resources.

Currently, when instances of the same program are dispersed within various components separated by network connections, security firewalls, etc. problems often arise with communication between the connected instances which sometimes result in errors caused by processing delays, data collision, data loss, and the like. Moreover, because resources are shared and distributed over a wide area and devices, security issues have become a concern.

To minimize such errors and security risks, the Cloud industry has responded through the use of processing and security protocols. Unfortunately, the additional protocols used by conventional Cloud systems often undermine Cloud computing's speed and agility as well as pose connectivity problems between instantiations of software programs hosted on different servers and data locations separated by data partitions.

Therefore, what is needed is a method and apparatus to allow instances of a software application running in multiple clusters, units, etc. to work efficiently and seamlessly while preserving network security.

SUMMARY

Implementations described herein provide a bidirectional tool configured to provide APIs to enable a cross-cluster service handshakes and enable two or more instances of an application registered to one cluster and other cluster provides for multi environment interaction. Using a common service registration, users can trigger actions on different instances of the application running in different environments such as a development environment, production environment, and the like. Using such common registration, applications can scale by having extra instances running while a centralized service works as central hub were each instance is registered.

In one implementation, a mechanism provides mutual registration for instances of the same application running in multiple clusters, units, arrays of servers (referred to herein as point-of-delivery services, or, PODs), etc. In one particular use case the registration is leveraged to expand the available deployment targets options and provide an isolated running environment for different scenarios, e.g., design, testing, production, etc.

Exemplary implementations also provide a method for receiving a first set of software links pointing to a first instantiation of a software application on a first POD receiving a second set of software links pointing to a second instantiation of the software application on a second POD, transforming the first set of software links into a first set of data objects representing manageable resources for a first environment, transforming the second set of software links into a second set of data objects representing manageable resources for a second environment, and storing the first and second set of data objects.

Other implementations include a Deployment Asset Management (DAM) API layers process implemented as middle layer API instantiated, for example, between different computing environments such as a design time environment, production environment, and the like. DAMs may be considered stateless as they are positioned between two software layers having different states. DAMs may also be configured as a communication layer for communicating process information, such as lifecycle design and runtime information, regardless of the project type, application, etc., being deployed. DAMs provide a multitude of services to gather, deploy, undeploy, or perform particular services like start, stop, activate, shutdown or update a service endpoint post deployment, all of these with applications as composites from design into runtime.

In exemplary implementations, DAMs provide a means for users to perform actions between two different layers, through a plurality of processes such as, mbeans, Service Oriented Architecture (SOA), server by HTTP request, and the like without to deal with some concepts like composite, partitions, etc.

In addition, DAMs may be configured to determine and resolve issues regarding connectivity and communication between two or more instantiations of an application distributed among a plurality of servers running a full contained configuration running a service, such as an Oracle POD which is described in the "Oracle Service Cloud Platform" white paper, incorporated by reference herein for all purposes.

In implementations, a POD is configured as a "point-of-delivery," which is a deployable module that delivers one or more services. One implementation includes a deployable unit built for modularity and scalability, which is designed to be replicated as needed.

Another implementation can include: a module of network, compute, storage, and application components that work together to form a repeatable design pattern. In another embodiment a POD comprises all the different parts that need to be setup to provision a client with an instance of the service, which may include, for example, Weblogic platform nodes, Database, Coherence cluster, Filesystem, etc.

In a further implementation, in addition to database clusters and firewalls, a POD may be configured with arrays of other optional servers like Chat, Email, Utility, and File Attachment, and the like, to function together. A customer's presence on a POD may be referred to as a customer site. One or more PODs exist in each physical data center, and each POD can have a corresponding disaster recovery—or DR—POD to which its data is replicated and which can be activated in the event of fault in the primary POD.

Implementations of DAMs may also provide multi-POD support, where one or more DAMs are being exposed, for example, as a RESTful APIs, and depending on which partition the user is invoking, such DAMs call internally or remotely depending on a dynamic partition-POD configuration.

DAMs may also be configured to analyze the various instantiations and provide a user a complete history from, for example, a development phase through deployment of the application instantiated on two or more PODs.

A further understanding of the nature and the advantages of particular embodiments disclosed herein may be realized by reference of the remaining portions of the specification and the attached drawings.

BRIEF DESCRIPTION OF THE DRAWINGS

FIGS. 6A and 6B are high level diagrams of RESTful services.

A further understanding of the nature and the advantages of particular embodiments disclosed herein may be realized by reference of the remaining portions of the specification and the attached drawings.

DETAILED DESCRIPTION OF EMBODIMENTS

Figure 1:
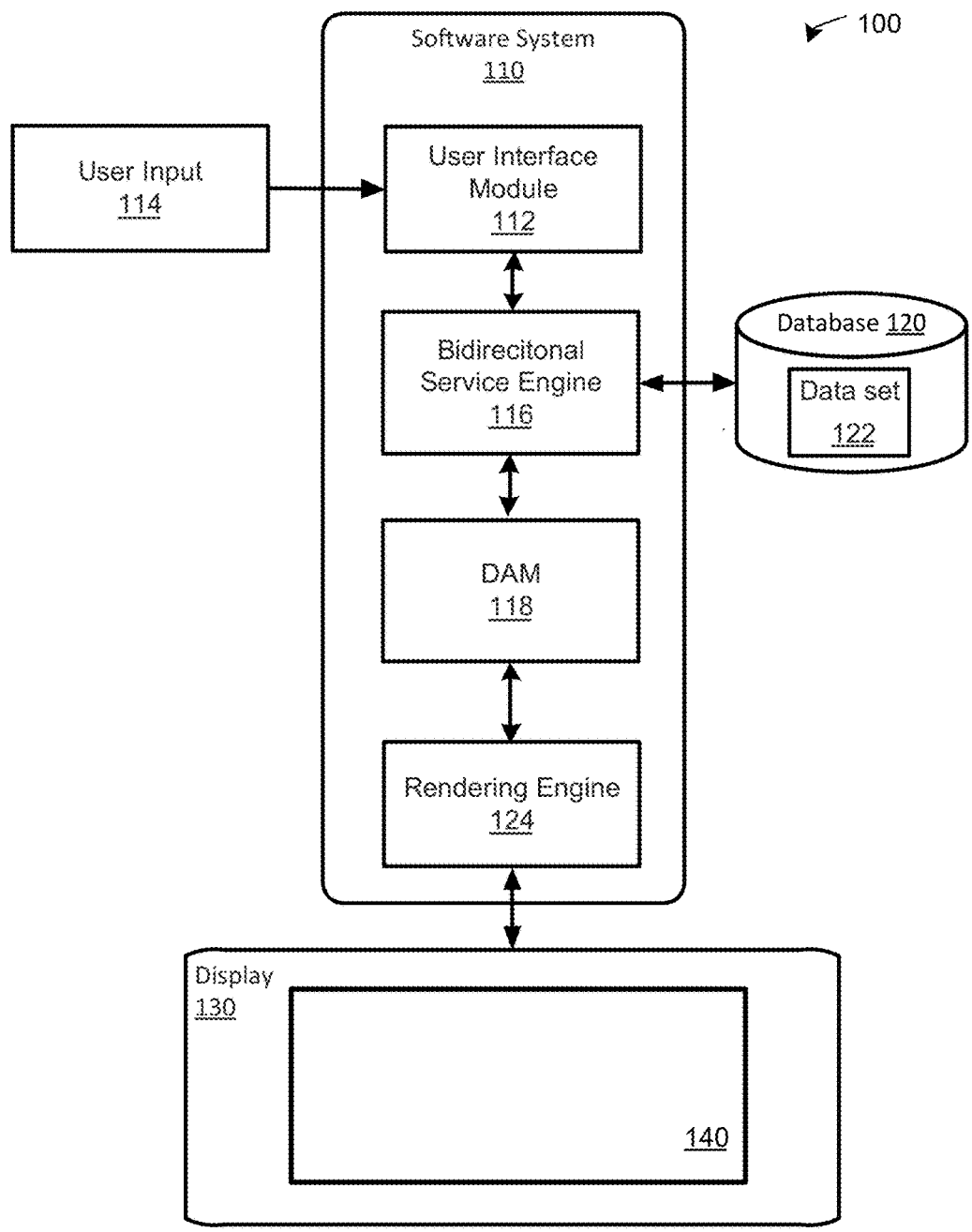
FIG. 1 is a high level illustration of a software deployment system.

FIG. 1 is a high-level block diagram of an exemplary computing system 100 for providing bidirectional services and interface layers, such as a DAM described herein, allowing users seamless connectivity between different instantiations of an application located in different environments (e.g., development environment, production environment, etc.). Computing system 100 may be any computing system, such as an enterprise computing environment, client-server system, and the like. Computing system 100 includes software system 110 configured to process data received from a user interface 114, such as a keyboard, mouse, etc.

Note that the computing system 100 presents a particular example implementation, where computer code for implementing embodiments may be implemented, at least in part, on a server. However, embodiments are not limited thereto. For example, a client-side software application may implement software interface system 110, or portions thereof, in accordance with the present teachings without requiring communications between the client-side software application and a server.

In one exemplary implementation, software system 110 is connected to display 130 configured to display data 140, for example, to a user thereof. Display 130 may be a passive or an active display, adapted to allow a user to view and interact with graphical data 140 displayed thereon, via user interface 114. In other configurations, display 130 may be a touch screen display responsive to touches, gestures, swipes, and the like for use in interacting with and manipulating data 140 by a user thereof. Gestures may include single gestures, multi-touch gestures, and other combinations of gestures and user inputs adapted to allow a user to convert, model, generate, deploy, and maintain data 140.

In other implementations, computing system 100 may include a data source such as database 120. Database 120 may be connected to the software system 110 directly or indirectly, for example via a network connection, and may be implemented as a non-transitory data structure stored on a local memory device, such as a hard drive, Solid State Drive (SSD), flash memory, and the like, or may be stored as a part of a Cloud network, as further described herein.

Database 120 may contain data sets 122. Data sets 122 may include data as described herein. Data sets 122 may also include data pertaining to data attributes, data hierarchy, nodal positions, values, summations, types of charts of visualizations, algorithms, code (e.g., C++, Javascript, JSON, etc.), source, security, hashes, XML, and the like. In addition, data sets 122 may also contain other data, data elements, and information such as metadata, labels, development-time information, run-time information, configuration information, API, interface component information, library information, pointers, and the like.

Software system 110 may include user interface module 112, bidirectional service engine 116, DAM 118, and rendering engine 124. User interface module 112 may be configured to receive and process data signals and information received from user interface 114. For example, user interface module 112 may be adapted to receive and process data from user input associated with data sets 122 for processing via software system 110.

In an exemplary implementation, bidirectional service engine 116 may be adapted to receive data from user interface 114 and/or database 120 for processing thereof. In one configuration, bidirectional service engine 116 is a software engine configured to receive and process input data from a user thereof pertaining to data sets 122 from user interface module 114 and/or database 120 in order to generate a cross cluster service handshake.

Bidirectional service engine 116 in other implementations may be configured as a data analysis tool to perform analysis functions associated with data sets 122. Such analysis functions may include determining the attributes associated with the data, determining the type of data, determining the values of the data, determining the relationships to other data, interpreting metadata associated with the data, and the like. For example, bidirectional service engine 116 may be configured to receive and analyze data sets 122 to determine user interface configuration, data processing instructions, data attributes, data hierarchy, nodes, nodal positions within the hierarchy, values, summations, algorithms, source, security, hashes, and the like, associated with data sets 122.

Bidirectional service engine 116 may receive existing data sets 122 from database 120 for processing thereof. Such data sets 122 may include and represent a composite of separate data sets 122 and data elements pertaining to, for example, organizational data, which may include employment data, salary data, personnel data, and the like. In addition, data sets 122 may include other types of data, data elements, and information such as contact data, sales data, production data, scientific data, financial data, medical data, census data, and the like.

In an implementation, DAM 118 includes a backend framework, that when used to deploy a new app may be configured to expose web services, consume services, receive externals events, request, etc. DAM 118 may be adapted to receive data from user interface 114 and/or database 120 for processing thereof. In one configuration, DAM 118 is a software engine configured to receive and process input data from a user thereof pertaining to data sets 122 from user interface module 114 and/or database 120 in order to provide a stateless API layer.

DAM 118 in other implementations may be configured as a data analysis tool to perform analysis functions associated with data sets 122. Such analysis functions may include determining attributes associated with the data, partitions, local and remote PODs (Layers), communication protocols, determining the relationships to other data, interpreting metadata associated with the data, and the like.

Rendering engine 124 may be configured to receive configuration data pertaining to data 140, associated data sets 122, and other data such as user interface components, icons, user pointing device signals, and the like, used to render data 140 on display 130. In one exemplary implementation, rendering engine 124 may be configured to render 2D and 3D graphical models and simulations to allow a user to obtain more information about data sets 122 bound to data 140. In one implementation, upon receiving instruction from a user, for example, through user interface 114, rendering engine 124 may be configured to generate a real-time display of interactive changes being made to data 140 by a user thereof.

Figure 2:
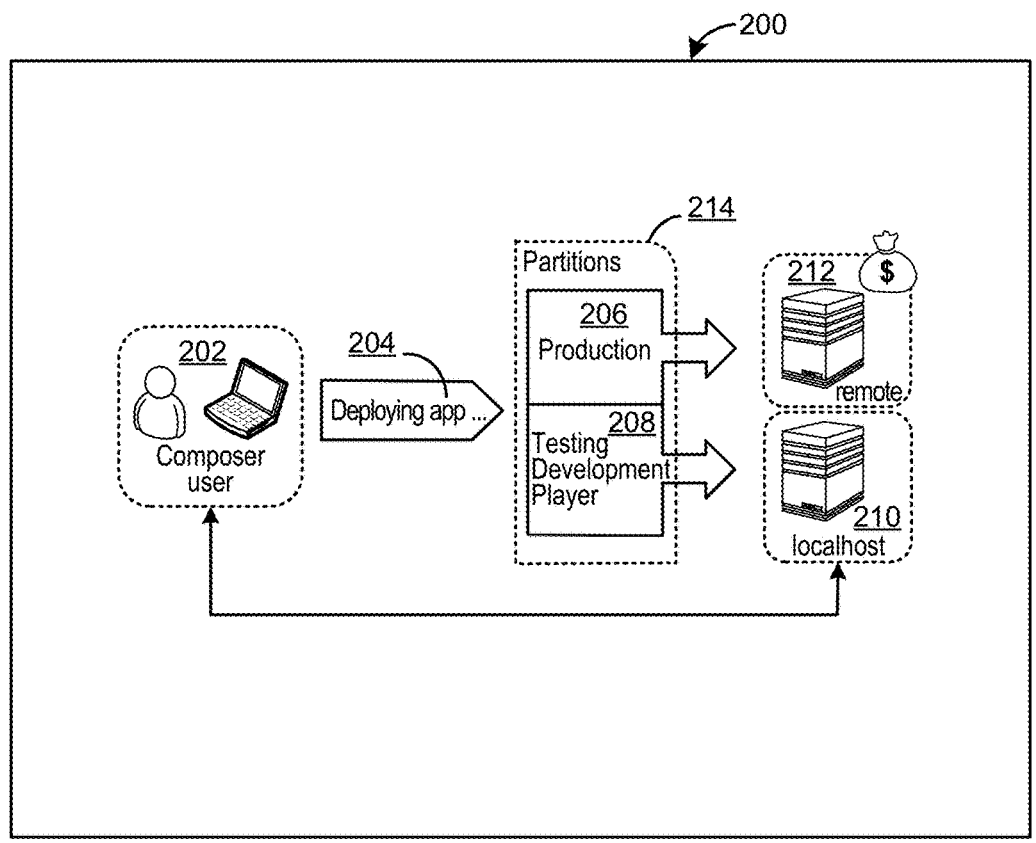
FIG. 2 is a high level diagram of deploying instances of a software application into remote and local hosts.

FIG. 2 is a high-level diagram 200 illustrating deploying instances of a software application 202 on remote and local hosts 210. A user is illustrated interacting with a software application 202, such as Oracle's COMPOSER that enables any web related portal to be customized or personalized after it has been deployed and is in use. Software application 202 may be deployed using a deployment action 204, deployed, for example, using bidirectional service engine 116, into a first environment 206 and into a second environment 208, such as a testing environment, development environment, and the like instantiated on local host 210 and remote host 212.

First environment 206 and second environment 208 may be separated via one or more partitions 214, configured to provide varying levels of isolation and security between the environments 206 and 208. In order to improve processor utilization and efficiency partitions 214 may be dynamically set to several different levels that adjust the level of processing needed such as processing levels of production, testing, development, player, etc. For example, a "production level" of partition 214 may be used to provide a higher level of security and access relative to other partitions levels such as testing, development, player, etc. Thus, processor resources may be dynamically adjusted relative to the selected partition processing level in order to enhance processor efficiency while maintaining a desired level of security and isolation between environments.

Figure 3:
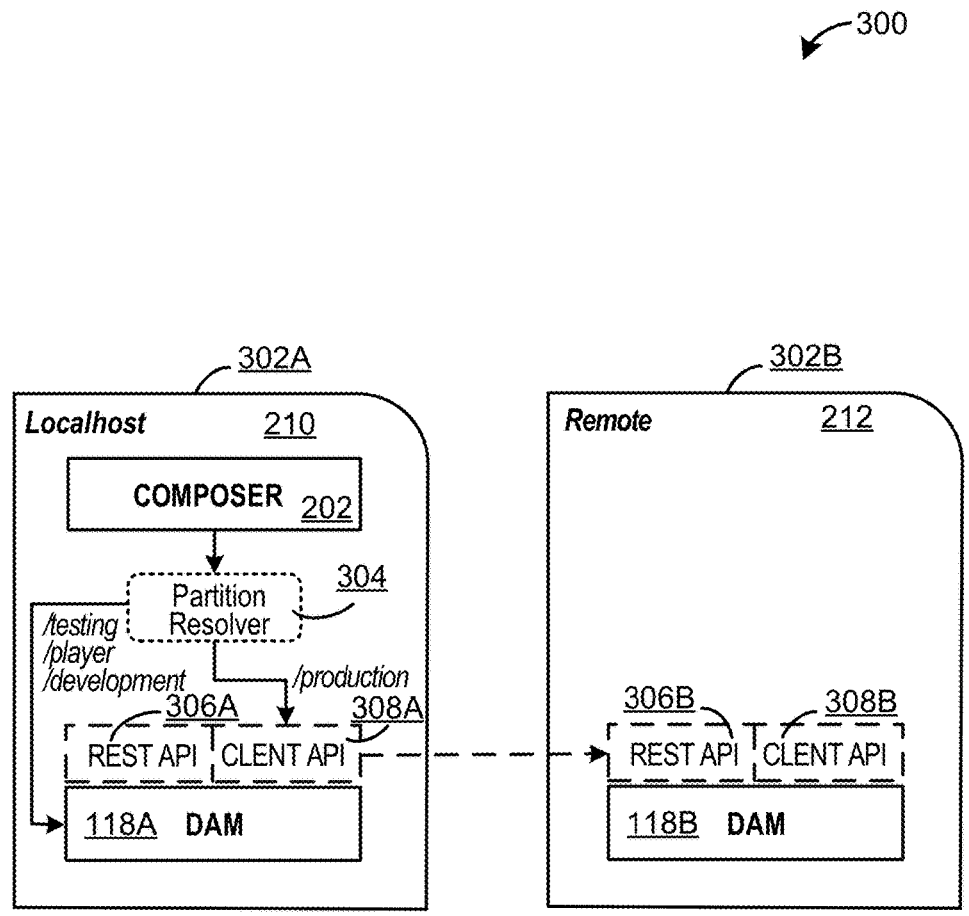
FIG. 3 is a high level diagram for showing deployment architecture between local and remote hosts.

FIG. 3 is a high level diagram for showing deployment architecture 300 between local 210 and remote 212 hosts using an architecture, such as a representational state transfer (REST) architecture, configured to use a coordinated set of components, connectors, and data elements. In one implementation, both local host 210 and remote host 212 are configured as a deployable point-of-delivery module or POD 302 configured to deliver a service. As illustrated, local host 210 may configured as a POD 302A and remote host 212 may be configured as POD 302B.

In exemplary implementations, POD 302A includes an application 202, a partition resolver 310, API 306A (e.g., rest API), API 308A (e.g. client API), and DAM 118A. In order to facilitate communication within POD 302A, partition resolver 304 is connected to API 308A, DAM 118A, and API 306A. Partition resolver 304 is configured to actively access and determine the level of partition 214 desired to allow, for example, improved processor efficiency, varying levels of security, varying levels of user access and control, and the like. For example, partition resolver 304 may be configured select either statically or in real-time between different levels of partitions 114 such as production, testing, development, and player, and the like in order to meet, for example, processor efficiency thresholds, user needs, security protocols, and the like.

POD 302B includes API 306B and API 308B in communication with DAM 118B. From the perspective of POD 302A, the connection of API 306A and API 308A with API 306B and API 308B provides a seamless interface between, for example, a development instance of DAM 118A and a production instance of DAM 118B.

In one scenario, software application 202 uses DAMs 118A and 118B as a stateless middle layer application configured to operate between both local host 210 and remote host 212. In this configuration, DAM 118A and 118B may be configured to receive information from application 210 and determine which host 210 or 212 to query. To communicate between hosts 210 and 212, DAMs 118A and 118B utilize APIs 306A and 306B. For example, a query from software application 202 to remote host 212 would take the path to partition resolver 304, which then directs the communication to API 308A. DAM 118B determines from the communication what information to transmit back to application 202 via API 306B.

In this scenario, although DAMs 118A and 118B are instantiated on different hosts, 210 A-B, such seamless interface provides a user with the ability to operate and communicate with each instance in a highly fluid and efficient manner.

In some implementations, DAM 118A exposes its core functionality through DAM 118B (to be accessible from external clients or even DAM in a different server). For example, a flow of communication may be:

COMPOSER (202)>PARTITION (304)>DAM (118A)+ CLIENT (308A)>DAM (118B)+CLIENT (306B)

In some scenarios, while DAM 118 could request and receive requests entirely through API 306, however to improve processing performance, API 308 may be contained in the same Application Server along with DAM 118, it can be a local java call thereby avoiding the overhead of every HTTP request. In this scenario, DAM 118 is configured to manage the entire process so that the client, e.g., software application 202 (e.g., Oracle PCS—Process Cloud Service) is not required to manage the process.

Thus, from the perspective of application 202, DAM 118A and 118B working with APIs 306A-B and APIs 308A-B, provide a seamless interface between POD 302A and POD 302B.

Figure 4:
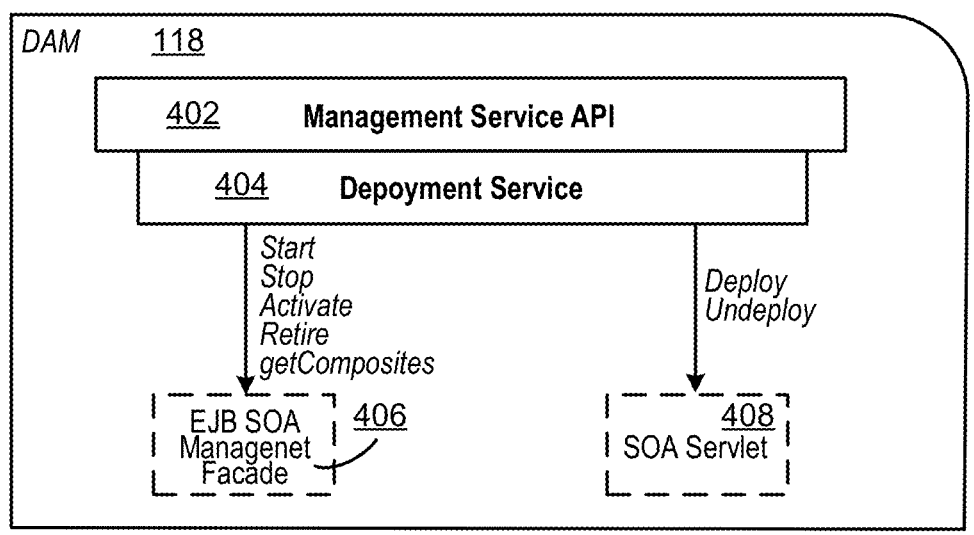
FIG. 4 is a high level diagram of a Deployment Asset Manager (DAM).

FIG. 4 is a high level diagram of a DAM 118. DAM 118 may include a respective management service API 402 and deployment service 404. Deployment service 404 is in communication with infrastructure management API 406, such as Oracle Façade used to perform functions such as start and stop, activate, retire, getComposites, etc. Deployment service 404 is also in communication with a servlet 408, such as a SOA servlet used to deploy and undeploy software instantiations.

Figure 5:
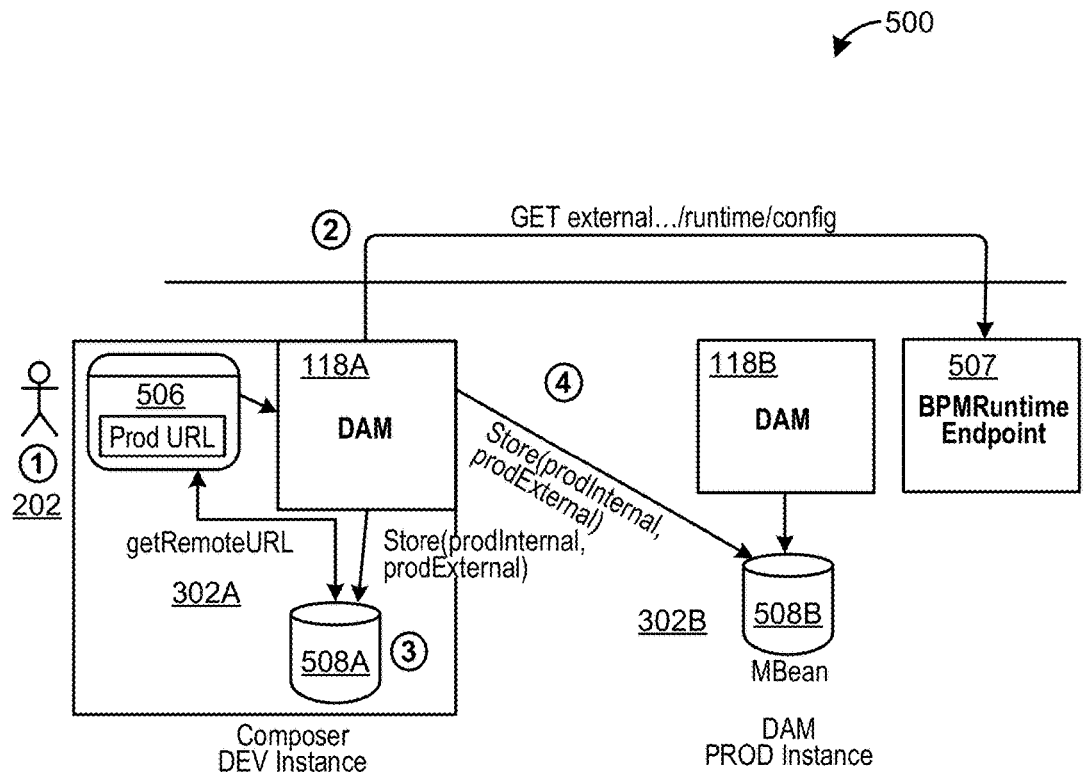
FIG. 5 is a high level diagram of management service associated with external and internal development and production environments.

FIG. 5 is a high level diagram of management service 500 associated with external and internal development and production environments. Composer development POD instance 302A includes DAM 118A coupled to a data object 508A and one ore more links 506, e.g., production URLs. Management service 500 also includes production POD instance 302B, which includes DAM 118B coupled to a data object 508B, and includes runtime endpoint 507.

In one implementation, a user at (1) is operating a software application 202, such as COMPOSER by ORACLE, which is instantiated as POD 302A, operating under DAM 118A and data object 508, such a Java MBean, representing a manageable instance of a component, device, or application. In this scenario, DAM 118A represents one instance of software application 202, and DAM 118B represents another instance of application 202 instantiated on POD 302B.

At (2) DAM 118A uses a common registration operation, which could be a REST operation by a API 306 as described herein, to gather the internal and external links for the POD 302A. At (3), DAM 118A stores the internal and external links for POD 302A into data object 508A. At (4) the internal and external links for POD 302A are received by DAM 118A and then stored in data object 508B. In this scenario, both DAM 118A and DAM 118B share common registrations, which allow the application and/or user to request which link is the registered link for POD 302A and POD 302B. In some implementations, POD 302A and POD 302B are configured with a common identity server, common OAM token, and at least some common user policies.

In implementations, POD 302, may be an Oracle POD, which is described in the "Oracle Service Cloud Platform" white paper, incorporated herein by reference for all purposes. In this scenario, POD 302 is configured as a deployable "point of delivery," which is a deployable module that delivers a service. One implementation includes a deployable unit built for modularity and scalability, which is meant to be replicated as needed. Another implementation can include: a module of network, compute, storage, and application components that work together to form a repeatable design pattern. In another embodiment POD 302 comprises some or all of the different parts that need to be setup to provision a client with an instance of the service, which may include, for example, Weblogic platform nodes, Database, Coherence cluster, Filesystem, etc.

In a further implementation, in addition to database clusters and firewalls, arrays of other optional servers like Chat, Email, Utility, and File Attachment, and the like, function together to comprise what is known as a pod. A customer's presence on a POD 302 may be referred to as a customer site. One or more PODs 302 may exist in each physical data center, and each POD 302 may have a corresponding disaster recovery—or DR—POD 302 to which its data is replicated and which can be activated in the event of fault in the primary POD 302.

FIGS. 6A and 6B are high level diagrams of some RESTful services and parameters used by DAM 118. Such RESTful services allow DAM 118 to operate quickly, reliably, and provide DAM 118 with the ability to scale (to grow and easily support extra users). As such, DAM 118 works with reusable components that can be managed and updated without affecting the system as a whole while it is running. Advantageously, unlike conventional protocols, such RESTful services are designed to be readily accessed by all language environments without the requirement of a driver to be installed or managed.

Figure 7:
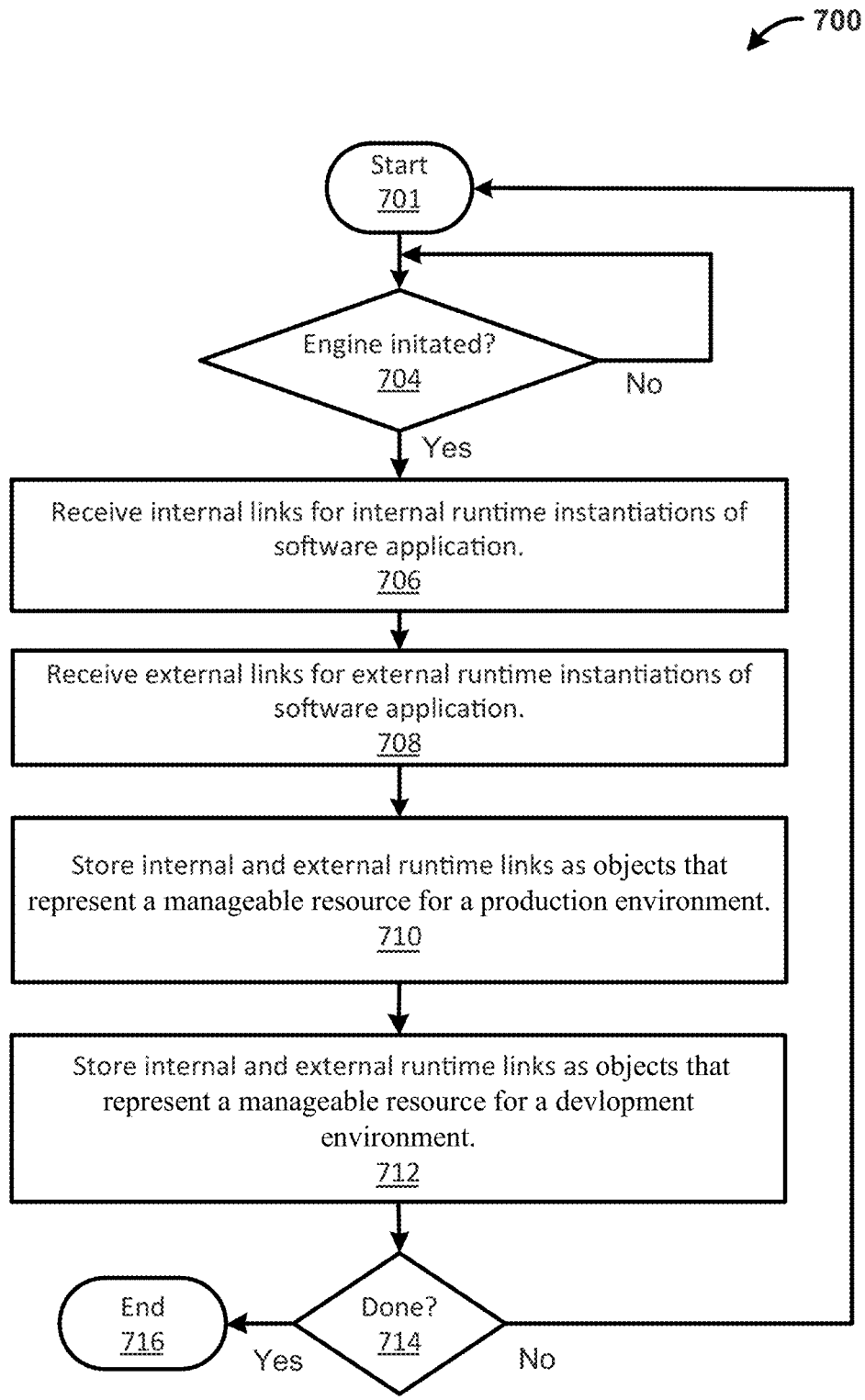
FIG. 7 is a flow diagram of an example method for storing internal and external links as objects.

FIG. 7 is a flow diagram of an example method 700 for storing internal and external links as objects. At 701, method may be entered into when, for example, computing system 100 is activated. At 704, method 700 determines whether bidirectional engine 116 is initiated. If not, method 700 returns to 701. If so, method 700 proceeds to 706 to receive internal links for one or more internal runtime instantiations of a software application. At 708, method 700 receives external links for one or more external runtime instantiations of the software application. At 710, internal and external runtime links are stored as objects, such a Java MBean, the represent a manageable resource for a production environment. At 712, internal and external runtime links are stored as objects, such as Java MBean. At 714, method 700 determines whether the process of receiving and storing internal an external links is done. If not, then method 700 returns to 701. If so, method 700 ends at 716.

Figure 8:
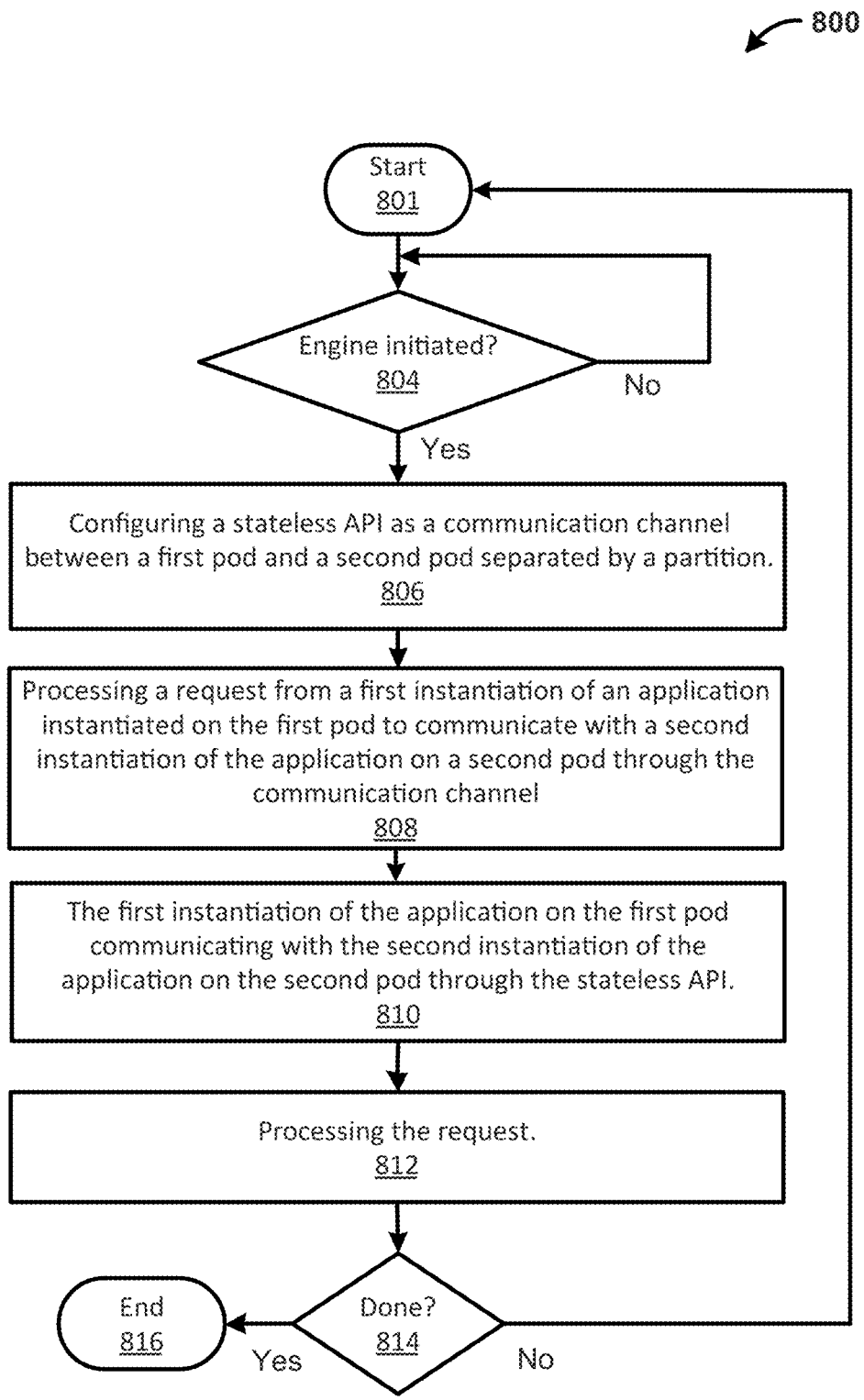
FIG. 8 is a flow diagram of an example method for configuring a stateless API as a communication channel between PODs separated by partitions.

FIG. 8 is a flow diagram of an example method 800 for configuring a stateless API as a communication channel between PODs 302 separated by one or more partitions 214 configured with selected levels of isolation and security. At 801, method 800 may be entered into when, for example, software deployment system 100 is activated. At 804, method 800 determines whether DAM 118 is initiated. If not, method 800 returns to 801. If so, method 800 proceeds to 806 configure a stateless API as a communication channel between a first POD, e.g., POD 302A, and a second POD, e.g., POD 302B separated by a partition 214. At 808, method 800 process a request from a first instantiation of an application, e.g., software application 202, instantiated on the first pod to communicate with a second instantiation of the application on a second pod through the communication channel. At 810, the first instantiation of the application on the first pod communicates with the second instantiation of the application on the second pod through the stateless API. At 812, the request is processed. At 814, method 800 determines whether the process is complete. If not, then method 800 returns to 801. If so, method 800 ends at 816.

Figure 9:
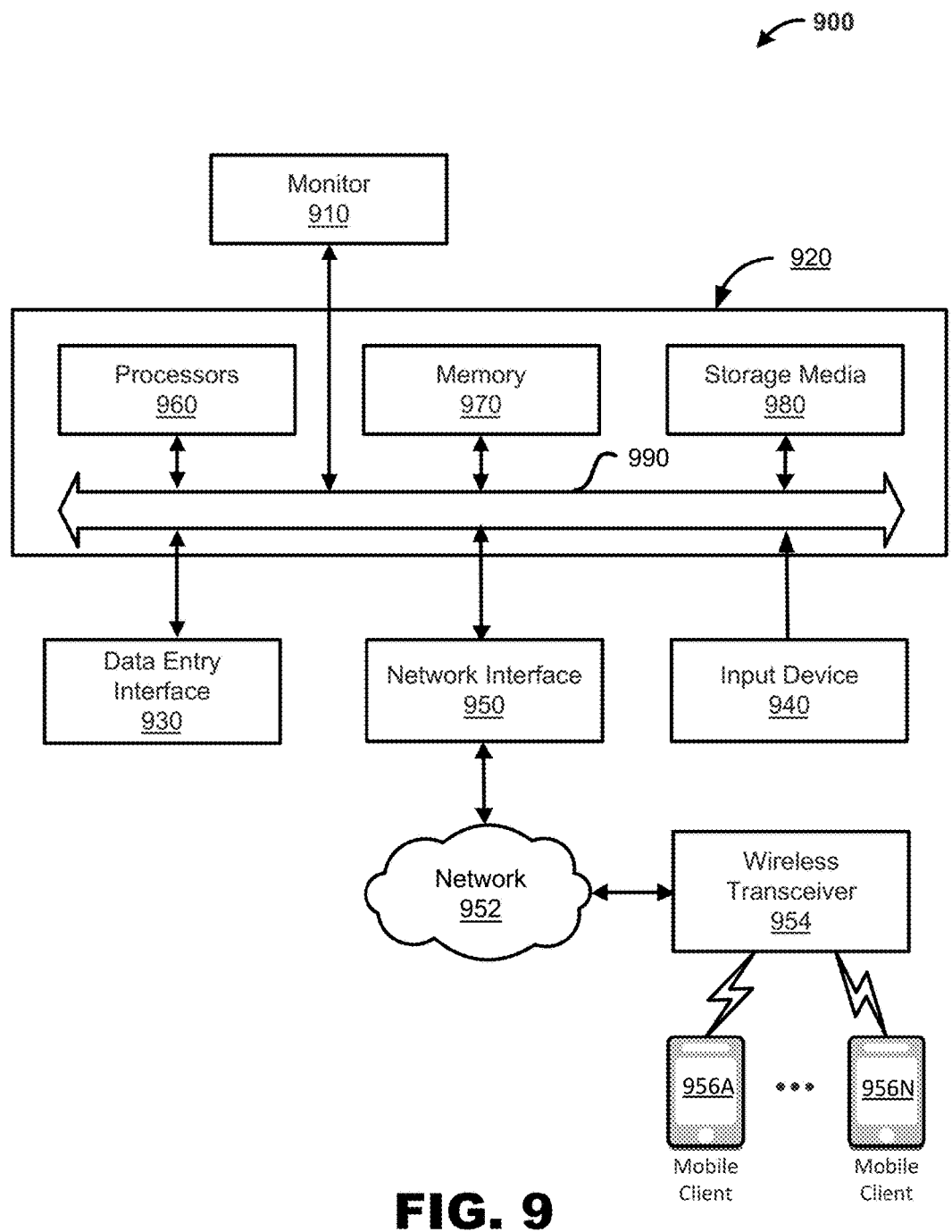
FIG. 9 is a high-level block diagram of an exemplary computer and communication system.

FIG. 9 is a block diagram of an exemplary computer system 900 for use with implementations described herein. Computer system 900 is merely illustrative and not intended to limit the scope of the claims. One of ordinary skill in the art would recognize other variations, modifications, and alternatives. For example, computer system 900 may be implemented in a distributed client-server configuration having one or more client devices in communication with one or more server systems.

In one exemplary implementation, computer system 900 includes a display device such as a monitor 910, computer 920, a data entry device 930 such as a keyboard, touch device, and the like, a user input device 940, a network communication interface 950, and the like. User input device 940 is typically embodied as a computer mouse, a trackball, a track pad, wireless remote, tablet, touch screen, and the like. Moreover, user input device 940 typically allows a user to select and operate objects, icons, text, characters, and the like that appear, for example, on the monitor 910.

Network interface 950 typically includes an Ethernet card, a modem (telephone, satellite, cable, ISDN), (asynchronous) digital subscriber line (DSL) unit, and the like. Further, network interface 950 may be physically integrated on the motherboard of computer 920, may be a software program, such as soft DSL, or the like.

Computer system 900 may also include software that enables communications over communication network 952 such as the HTTP, TCP/IP, RTP/RTSP, protocols, wireless application protocol (WAP), IEEE 802.11 protocols, and the like. In addition to and/or alternatively, other communications software and transfer protocols may also be used, for example IPX, UDP or the like.

Communication network 952 may include a local area network, a wide area network, a wireless network, an Intranet, the Internet, a private network, a public network, a switched network, or any other suitable communication network, such as for example Cloud networks. Communication network 952 may include many interconnected computer systems and any suitable communication links such as hardwire links, optical links, satellite or other wireless communications links such as BLUETOOTH, WIFI, wave propagation links, or any other suitable mechanisms for communication of information. For example, communication network 952 may communicate to one or more mobile wireless devices 956A-N, such as mobile phones, tablets, and the like, via a base station such as wireless transceiver 954.

Computer 920 typically includes familiar computer components such as one or more processors 960, and memory storage devices, such as a memory 970, e.g., random access memory (RAM), storage media 980, and system bus 990 interconnecting the above components. In one embodiment, computer 920 is a PC compatible computer having multiple microprocessors, graphics processing units (GPU), and the like. While a computer is shown, it will be readily apparent to one of ordinary skill in the art that many other hardware and software configurations are suitable for use with the present invention.

Memory 970 and Storage media 980 are examples of non-transitory tangible media for storage of data, audio/video files, computer programs, and the like. Other types of tangible media include disk drives, solid-state drives, floppy disks, optical storage media such as CD-ROMS and bar codes, semiconductor memories such as flash drives, flash memories, read-only-memories (ROMS), battery-backed volatile memories, networked storage devices, Cloud storage, and the like.

Although the description has been described with respect to particular embodiments thereof, these particular embodiments are merely illustrative, and not restrictive. Further details of embodiments may be found in the attached documents provided with this application.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:

1. A non-transitory computer readable medium including one or more instructions executable by one or more processors for:
   receiving a first set of software links pointing to a first instantiation of a software application on a first point-of-delivery service (POD);
   receiving a second set of software links pointing to a second instantiation of the software application on a second POD;
   transforming the first set of software links into a first set of data objects representing manageable resources for a first environment;
   transforming the second set of software links into a second set of data objects representing manageable resources for a second environment; and
   storing the first set and second set of data objects.

2. The computer readable medium of claim 1, wherein the first set of software links and the second set of software links are uniform resource locators.

3. The computer readable medium of claim 1, wherein the first set and second set of data objects comprise MBean Java objects.

4. The computer readable medium of claim 1, further comprising deploying the first POD and the second POD using a representational state transfer architecture configured to use a coordinated set of components, connectors, and data elements.

5. The computer readable medium of claim 1, further comprising:
configuring a stateless application program interface (API) as a communication channel between the first POD and the second POD separated by a partition;
determining a partition processing level;
adjusting processor resources relative to the partition processing level; and
processing a request from the first instantiation of the software application to communicate with the second instantiation of the software application through the communication channel.

6. The computer readable medium of claim 5, wherein the stateless API is a deployment asset manager.

7. The computer readable medium of claim 5, wherein the stateless API comprises a management service API and a deployment service API.

8. The computer readable medium of claim 5, wherein the stateless API comprises a first deployment application manager instantiated on the first POD coupled to a second deployment application manager instantiated on the second POD, wherein the first deployment application manager exposes its core functions through the second deployment application manager.

9. The computer readable medium of claim 8, wherein the first deployment asset manager and the second deployment asset manager share a common registration.

10. The computer readable medium of claim 8, wherein the first deployment asset manager and the second deployment asset comprises a common identity server.

11. A processor implemented method comprising:
receiving a first set of software links pointing to a first instantiation of a software application on a first point-of-delivery service (POD);
receiving a second set of software links pointing to a second instantiation of the software application on a second POD;
transforming the first set of software links into a first set of data objects representing manageable resources for a first environment;
transforming the second set of software links into a second set of data objects representing manageable resources for a second environment; and
storing the first set and second set of data objects.

12. The method of claim 11, wherein the first set of software links and the second set of software links are uniform resource locators.

13. The method of claim 11, wherein the first set and second set of data objects comprise MBean Java objects.

14. The method of claim 11, further comprising deploying the first POD and the second POD using a representational state transfer architecture configured to use a coordinated set of components, connectors, and data elements.

15. The method of claim 11, further comprising:
configuring a stateless application program interface (API) as a communication channel between the first POD and the second POD separated by a partition;
determining a partition processing level;
adjusting processor resources relative to the partition processing level; and
processing a request from the first instantiation of the software application to communicate with the second instantiation of the software application through the communication channel.

16. The method of claim 15, wherein the stateless API comprises a deployment asset manager.

17. The method of claim 15, wherein the stateless API comprises a management service API and a deployment service API.

18. The method of claim 15, wherein the stateless API comprises a first deployment application manager instantiated on the first POD coupled to a second deployment application manager instantiated on the second POD, wherein the first deployment application manager exposes its core functions through the second deployment application manager.

19. The method of claim 18, wherein the first deployment asset manager and the second deployment asset manager share a common registration.

20. An apparatus for enabling bidirectional service registration in a computing environment, the computing environment comprising one or more computing devices in communication with a software backup application that executes software configured to provide information accessible to the one or more computing devices, a computing device of the one or more computing devices configured to:
receive a first set of software links pointing to a first instantiation of a software application on a first point-of-delivery service (POD);
receive a second set of software links pointing to a second instantiation of the software application on a second POD;
transform the first set of software links into a first set of data objects representing manageable resources for a first environment;
transform the second set of software links into a second set of data objects representing manageable resources for a second environment; and
store the first set and second set of data objects.

* * * * *